(12) United States Patent
Mamiya et al.

(10) Patent No.: US 7,564,751 B2
(45) Date of Patent: Jul. 21, 2009

(54) LASER POWER ADJUSTMENT METHOD AND OPTICAL RECORDING AND REPRODUCTION APPARATUS

(75) Inventors: Noboru Mamiya, Mizuho (JP); Ken Hirose, Gifu (JP); Kenji Nakao, Gifu (JP)

(73) Assignee: Sanyo Electric Co., Ltd., Osaka (JP)

( * ) Notice: Subject to any disclaimer, the term of this patent is extended or adjusted under 35 U.S.C. 154(b) by 497 days.

(21) Appl. No.: 11/029,381

(22) Filed: Jan. 6, 2005

(65) Prior Publication Data
US 2005/0163008 A1 Jul. 28, 2005

(30) Foreign Application Priority Data
Jan. 22, 2004 (JP) .............................. 2004-014983

(51) Int. Cl.
G11B 7/12 (2006.01)
G11B 5/09 (2006.01)
(52) U.S. Cl. .................. 369/47.53; 369/47.5; 369/53.1; 369/59.11; 369/116; 369/47.3
(58) Field of Classification Search .............. 369/59.11, 369/47.3, 116, 47.5–47.53
See application file for complete search history.

(56) References Cited

U.S. PATENT DOCUMENTS 5,640,381 A * 6/1997 Call et al. ................. 369/47.52
6,577,571 B2 * 6/2003 Takeda et al. ............. 369/47.53
6,778,478 B2 * 8/2004 Mashimo et al. .......... 369/47.53
2003/0039188 A1 * 2/2003 Fukuchi et al. ........... 369/47.53
2004/0001411 A1 * 1/2004 Morishima ................ 369/53.28
2005/0030860 A1 * 2/2005 Gage et al. ................ 369/47.53
2005/0152248 A1 * 7/2005 Mimnagh et al. ......... 369/47.53
2006/0146673 A1 * 7/2006 Shoji et al. ................ 369/47.53

OTHER PUBLICATIONS

Chinese Office Action, with partial English translation, issued in Chinese Patent Application No. CN 200510004533.8, mailed on Jun. 2, 2006.
"4.2 OPC (Optimum Write Power Control) Technique." Jan. 22, 2002, Triceps Planning Department, Publisher: Ken Kawachi, pp. 1-3(Partial English Translation Of Japanese Publication) Japanese Version: "DVD + RW/+R" pp. 1-5 http://www.catnet.ne.jp/triceps.

* cited by examiner

Primary Examiner—Wayne R Young
Assistant Examiner—Dionne H Pendleton
(74) Attorney, Agent, or Firm—McDermott Will & Emery LLP (57) ABSTRACT

In order to set optimum laser power for a disk smoothly and appropriately with a small number of times of test writing, an integrated value Sn is obtained from each kind of laser power Pwn set for the test writing and the modulation factor m(Pwn) of a reflection light intensity obtained through the test writing with the laser power Pwn using an expression "Sn=m(Pwn)× Pwn$^2$", laser power Pwth is obtained at which the modulation factor m(Pwn) becomes zero when relational characteristics of the integrated value Sn and the laser power Pwn are linearly approximated, and optimum laser power Pw is set based on the laser power Pwth. Here, the optimum laser power Pw is obtained from the target γ value of the disk using an expression "Pw=Pwth×{1+1/(γ+1)}". The target γ value is obtained from an ADIP of the disk.

3 Claims, 11 Drawing Sheets

| Pw(mW) | m(%) | Pw*m | Pw^2*m |
|---|---|---|---|
| 16.06718 | 42.68 | 685.7474 | 11018.03 |
| 16.51851 | 46.01 | 760.0166 | 12554.34 |
| 16.96983 | 50.9 | 863.7645 | 14657.94 |
| 17.42116 | 52.76 | 919.1403 | 16012.49 |
| 17.87248 | 55.9 | 999.0719 | 17855.9 |
| 18.32381 | 58.75 | 1076.524 | 19726.02 |
| 18.77513 | 61.21 | 1149.226 | 21576.87 |
| 19.22646 | 63.41 | 1219.15 | 23439.94 |
| 19.67779 | 66.26 | 1303.85 | 25656.88 |
| 20.12911 | 67.48 | 1358.312 | 27341.62 |
| 20.58044 | 69.87 | 1437.955 | 29593.74 |
| 21.03176 | 70.3 | 1478.533 | 31096.15 |
| 21.48309 | 71.68 | 1539.908 | 33081.97 |
| 21.93441 | 72.72 | 1595.07 | 34986.93 |
| 22.38574 | 73.33 | 1641.546 | 36747.22 |
| 22.83706 | 74.09 | 1691.998 | 38640.27 |
| 23.28839 | 74.69 | 1739.41 | 40508.05 |

| Pw(mW) | m(%) | Pw*m | Pw^2*m |
|---|---|---|---|
| 11.34518 | 42.85 | 486.1411 | 5515.361 |
| 11.81015 | 49.05 | 579.2879 | 6841.477 |
| 12.27512 | 54.71 | 671.5717 | 8243.621 |
| 12.74008 | 59.49 | 757.9076 | 9655.806 |
| 13.20505 | 62.65 | 827.2964 | 10924.49 |
| 13.67002 | 65.6 | 896.7531 | 12258.63 |
| 14.13498 | 68.58 | 969.3772 | 13702.13 |
| 14.59995 | 70.96 | 1036.012 | 15125.73 |
| 15.06492 | 73.2 | 1102.752 | 16612.86 |
| 15.52988 | 75.16 | 1167.226 | 18126.88 |
| 15.99485 | 76.66 | 1226.165 | 19612.33 |
| 16.45982 | 77.7 | 1278.928 | 21050.91 |
| 16.92478 | 78.91 | 1335.535 | 22603.63 |
| 17.38975 | 80.27 | 1395.875 | 24273.92 |
| 17.85472 | 80.82 | 1443.018 | 25764.68 |
| 18.31968 | 81.37 | 1490.673 | 27308.65 |
| 18.78465 | 82.63 | 1552.176 | 29157.07 |

LASER POWER ADJUSTMENT METHOD AND OPTICAL RECORDING AND REPRODUCTION APPARATUS

BACKGROUND OF THE INVENTION

1. Field of the Invention

The present invention relates to a laser power adjustment method and an optical recording and reproduction apparatus, in particular, a technique suited for adjustment of recording laser power based on a γ value of a recording medium.

2. Description of the Related Art

Nowadays, in addition to reproduction-only type media such as CD-ROMs and DVD-ROMs, various optical recording media are commercialized and are widely used, examples of which are rewritable type media, such as CD-RWs and DVD-RWs, and write once type media such as CD-Rs, DVD-Rs, and DVD+Rs. Optimum laser power for recording and reproduction onto and from these optical recording media varies from media type to media type. In addition, even in the case of the same type media, the optimum laser power varies from medium to medium depending on, for instance, manufacturers of the media. Therefore, a drive apparatus that performs recording and reproduction onto and from the optical recording media is provided with a configuration for adjusting laser power for recording and reproduction to optimum values in accordance with the types, manufacturers, and the like of the media.

In standard specifications of the CD-RWs and DVD+RWs among the optical recording media, usage of a recording laser power adjustment method (γ method) that is based on γ values is described. With the adjustment method, recording laser power is adjusted to optimum values based on the modulation factors of reflection light intensities detected at the time of test writing and target γ values set for media in advance.

Also, in the standard specification of the DVD+RWs, it is in particular recommended to use a linear fit method that is one kind of the γ method. With the linear fit method, optimum laser power Pw is set for each medium in the manner described below. First, an integrated value Sn is obtained from each kind of recording laser power Pwn set for test writing and the modulation factor m(Pwn) of a reflection light intensity obtained through the test writing at the laser power Pwn using an expression "$Sn=m(Pwn) \times Pwn$". Next, laser power Pwth1 is obtained at which the modulation factor becomes zero when relational characteristics of Sn and Pwn is linearly approximated. Then, the optimum laser power Pw is obtained from Pwth1 and the target γ value of the medium using an expression "$Pw=Pwth \times (1+1/\gamma)$". This linear fit method is based on the assumption that a linear approximation expression is established for the relational characteristics of Sn and Pwn.

As a result of an actual measurement of the relational characteristics of Sn and Pwn conducted by the inventors of the present invention, however, it was found that respective measurement points are not arranged in a straight line manner and meander to some extent. Accordingly, it was found that it is impossible to precisely perform the linear approximation only with around two or three Sn and it is impossible to obtain accurate laser power unless the test writing and the computation of Sn are repeated a considerable number of times. When the test writing is repeated many times, however, this results in a situation where the processing load of the laser power adjustment is increased accordingly and a long period of time is needed for the laser power adjustment. Therefore, for commercialization, it is required to make it possible to accurately perform the laser power adjustment with around twice or three times of test writing.

SUMMARY OF THE INVENTION

It is therefore an object of the present invention to provide a laser power adjustment method and an optical recording and reproduction apparatus that are capable of relatively accurately adjusting laser power even with a small number of times of test writing.

The inventors of the present invention found that when Sn is obtained by multiplying a modulation factor m(Pwn) by the square of laser power Pwn, it becomes possible to linearly approximate the relational characteristics of Sn and Pwn while suppressing disturbances. In addition, the inventors newly found a technique of obtaining optimum laser power from laser power Pwth2 at which the modulation factor becomes zero on an approximation straight line for the relational characteristics the above. With those findings, it becomes possible to relatively accurately perform laser power adjustment even with a small number of times of test writing.

The present invention has the following features.

A first aspect of the present invention relates to a laser power adjustment method of performing laser power strength adjustment by performing test writing into a test writing area of a recording medium, including: obtaining an integrated value Sn for each kind of laser power Pwn set at the time of the test writing from a modulation factor m(Pwn) of a reflection light intensity obtained at the laser power Pwn using an expression "$Sn=m(Pwn) \times pwn^2$"; obtaining laser power Pwth at which the modulation factor m(Pwn) becomes zero when relational characteristics of the integrated value Sn and the laser power Pwn are linearly approximated; and obtaining optimum laser power Pw based on the laser power Pwth.

In the first aspect of the present invention, the optimum laser power Pw may be obtained from a target γ value of the recording medium using an expression "$Pw=Pwth \times \{1+1/(\gamma+1)\}$".

A second aspect of the present invention relates to an optical recording and reproduction apparatus that records and reproduces information by irradiating laser light onto a recording medium, including: means for obtaining a target γ value of the recording medium; and laser power adjustment means for adjusting laser power for recording, wherein the laser power adjustment means includes: means for performing test writing onto the recording medium at a plurality of kinds of laser power Pwn; means for obtaining a modulation factor m(Pwn) of a reflection light intensity for each kind of laser power Pwn set at the time of the test writing and obtaining an integrated value Sn from the obtained modulation factor m(Pwn) using an expression "$Sn=m(Pwn) \times Pwn^2$"; means for obtaining laser power Pwth at which the modulation factor m(Pwn) becomes zero when relational characteristics of the integrated value Sn and the laser power Pwn are linearly approximated; and means for obtaining optimum laser power Pw based on the laser power Pwth.

In the second aspect of the present invention, the optimum laser power Pw may be obtained from a target γ value of the recording medium using an expression "$Pw=Pwth \times \{1+1/(\gamma+1)\}$". Further, the optical recording and reproduction apparatus, in which the target γ value may be obtained by reproducing control information recorded on the recording medium.

According to each aspect of the present invention described above, in ordinary cases, the modulation factor m(Pwn) is obtained by reproducing a test writing area, in which test writing was performed, and detecting the intensity of reflection laser light at that time. However, when it is possible to obtain the modulation factor with precision, the intensity of laser light reflected from a recording medium at the time of the test writing may be detected and used for the modulation factor obtainment. Note that when the intensity of reflection light from a non-recording mark area is referred to as P0 and the intensity of reflection light from a recording mark area is referred to as P1, the "modulation factor" is given by an expression "(P0−P1)/P0".

It should be noted here that it is known that a γ value satisfies the following relational expression.

$$\gamma = \{dm(Pw)/dPw\} \times \{Pw/m(Pw)\} \quad (1)$$

As described above, the liner fit method is based on the assumption that the following relational expression is established.

$$m(Pw) \times Pw = M \times (Pw - Pwth) \quad (2)$$

Here, M is a convergence value of the modulation factor m(Pw) under a condition of "Pw=∞".

With the linear fit method, the optimum laser power Pw is obtained from Expression (1) and Expression (2). That is, by substituting Expression (2) into Expression (1), the following expression is obtained.

$$\gamma = Pwth/(Pw - Pwth) \quad (3)$$

By changing this Expression (3) as to Pw, Expression (4) given below is obtained. With the linear fit method described above, the optimum laser power Pw is obtained using Expression (4).

$$Pw = Pwth \times (1 + 1/\gamma) \quad (4)$$

In contrast to this, the inventors of the present invention disproved the assumption that Expression (2) described above is established and found from an actual measurement result that the following expression is established in place of Expression (2).

$$m(Pw) \times Pw^2 = M \times (Pw - Pwth) \quad (5)$$

By substituting Expression (5) into Expression (1), the following expression is obtained.

$$\gamma = \{2Pwth - Pw\}/(Pw - Pwth) \quad (6)$$

By changing Expression (6) as to Pw, Expression (7) given below is obtained. As indicated by the first and second aspects of the present invention described above, the optimum laser power Pw is obtained using Expression (7) in the present invention.

$$Pw = Pwth \times \{1 + 1/(\gamma + 1)\} \quad (7)$$

According to the present invention, by performing linear approximation using a relational expression "$Sn = m(Pwn) \times Pwn^2$" instead of the relational expression "$Sn = m(Pwn) \times Pwn$" conventionally used, it becomes possible to eliminate disturbances of the linear approximation. As a result, it becomes possible to accurately adjust laser power even with a small number of times of test writing.

BRIEF DESCRIPTION OF THE DRAWINGS

The above and other objects and novel features of the present invention will become apparent more completely from the following description of embodiments to be made with reference to the accompanying drawings, in which.

DETAILED DESCRIPTION OF THE PREFERRED EMBODIMENTS

Hereinafter, an embodiment of the present invention will be described with reference to the accompanying drawings. It should be noted here that the following embodiment is merely an example of the present invention and therefore there is no intention to limit the scope of the present invention to the embodiment.

Figure 1:
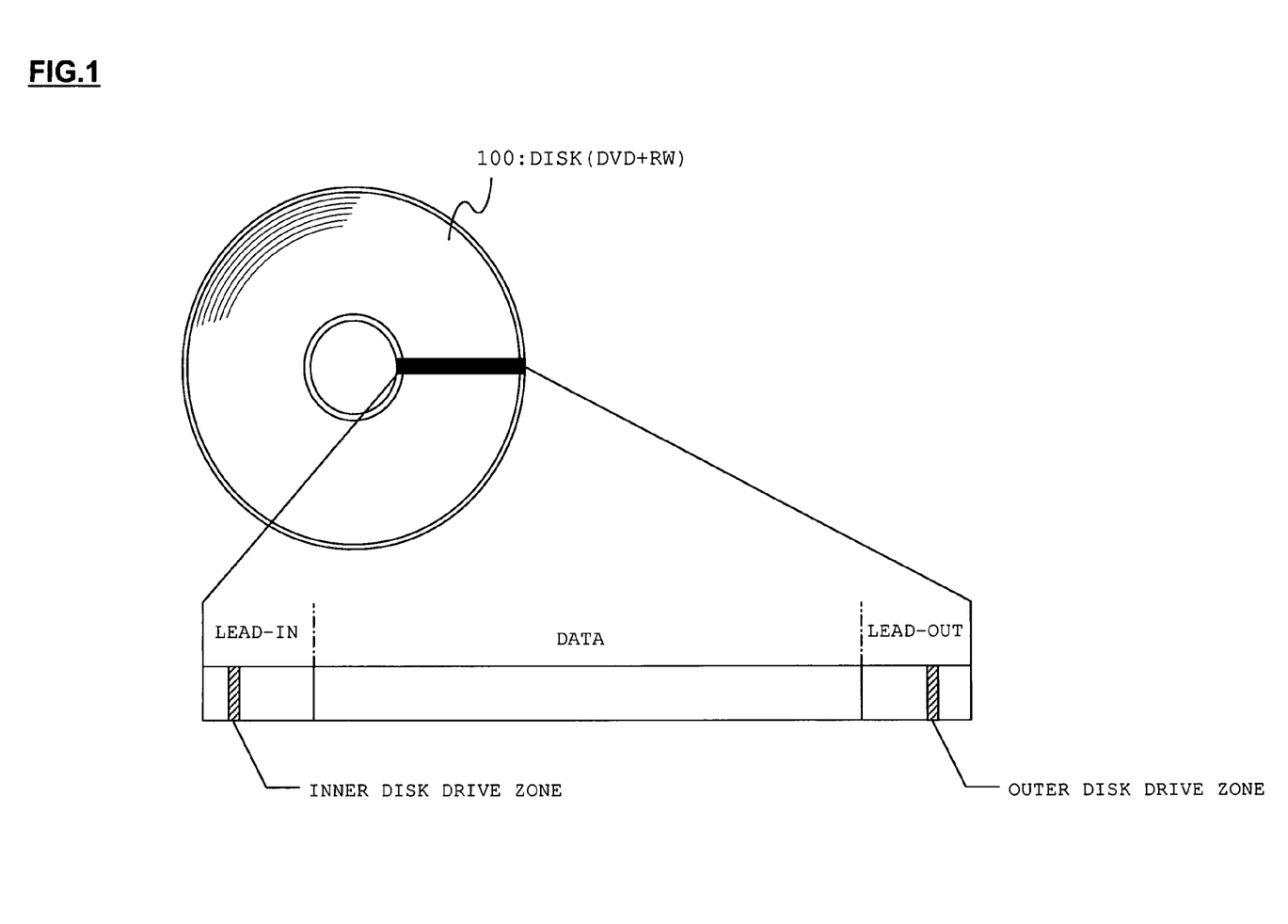
FIG. 1 shows a structure of an optical disk used in an embodiment of the present invention.

FIG. 1 shows a structure of a disk (DVD+RW) used in the embodiment of the present invention. As shown in FIG. 1, a disk 100 is divided into a lead-in area, a data area, and a lead-out area in its radius direction. In addition, the lead-in area and the lead-out area are partitioned into various zones. With an inner disk drive zone and an outer disk drive zone among the zones, laser power adjustment (OPC: Optimum Write Power Control) is performed.

Also, in the disk 100, a spiral groove is formed in a direction from an inner portion to an outer portion, and data is recorded to the groove. Here, the groove meanders (wobbles) in the radius direction and such wobbles are formed so that phase modulation sections called "ADIP (Address in pregroove)" are inserted into a monotonously meandering section in fixed cycles. When a beam scans the phase modulation sections, addresses on the groove are read and are reproduced. Also, at the ADIP in the lead-in area, various data for controlling the disk is recorded through phase modulation and a target γ value that should be given with respect to the disk is contained in the control data.

Figure 2:
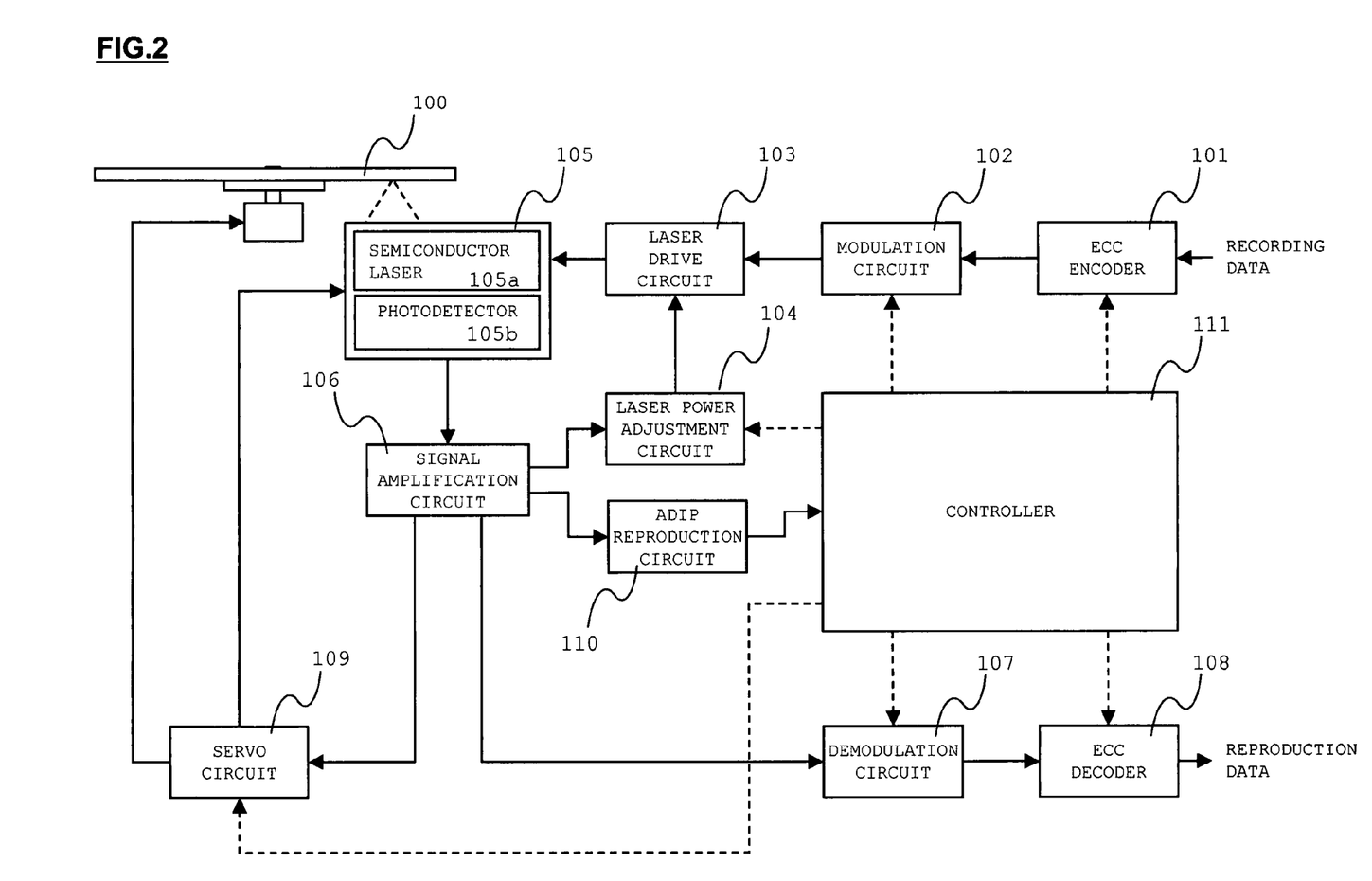
FIG. 2 shows a structure of an optical disk apparatus according to the embodiment of the present invention.

FIG. 2 shows a construction of an optical disk apparatus according to the embodiment of the present invention.

As shown in FIG. 2, the optical disk apparatus includes an ECC encoder 101, a modulation circuit 102, a laser drive circuit 103, a laser power adjustment circuit 104, an optical pickup 105, a signal amplification circuit 106, a demodulation circuit 107, an ECC decoder 108, a servo circuit 109, an ADIP reproduction circuit 110, and a controller 111.

The ECC encoder 101 adds an error correction code to inputted recording data and outputs resultant data to the modulation circuit 102. The modulation circuit 102 generates a recording signal by performing predetermined modulation on the data inputted from the ECC encoder 101 and outputs the generated recording signal to the laser drive circuit 103. The laser drive circuit 103 outputs a drive signal corresponding to the recording signal from the modulation circuit 102 to a semiconductor laser 105a at the time of recording and outputs a drive signal for emission of laser light having a single intensity to the semiconductor laser 105a at the time of reproduction. Here, laser power is set at laser power adjusted and set by the laser power adjustment circuit 104.

The laser power adjustment circuit 104 calculates a modulation factor m(Pwn) from the strength of a reproduction RF signal detected at the time of test writing and adjusts and sets laser power to and at an optimum value based on the calculated modulation factor m(Pwn) and the target γ value of the disk. Note that processing for adjusting the laser power will be described in detail later.

The optical pickup 105 includes the semiconductor laser 105a and a photodetector 105b and performs writing and reading of data with respect to the disk by converging laser light onto the groove. Note that in addition to these components, the optical pickup 105 includes an object lens actuator for adjusting the convergence position of the laser light with respect to the groove, an optical system for guiding the laser light emitted from the semiconductor laser 105a to an object lens and also guiding reflection light from the disk 100 to the photodetector 105b.

The signal amplification circuit 106 generates various signals by performing amplification and computation processing on a signal received from the photodetector 105b and outputs the generated signals to their corresponding circuits. The demodulation circuit 107 generates reproduction data by demodulating a reproduction RF signal inputted from the signal amplification circuit 106 and outputs the generated reproduction data to the ECC decoder 108. The ECC decoder 108 performs error correction on the reproduction data inputted from the demodulation circuit 107 and outputs resultant data to a subsequent circuit.

The servo circuit 109 generates a focus servo signal and a tracking servo signal from a focus error signal and a tracking error signal inputted from the signal amplification circuit 106 and outputs the generated signals to the object lens actuator of the optical pickup 105. Also, the servo circuit 109 generates a motor servo signal from a wobble signal inputted from the signal amplification circuit 106 and outputs the generated signal to a disk drive motor.

The ADIP reproduction circuit 110 reproduces address data and various kinds of control data from the wobble signal inputted from the signal amplification circuit 106 and outputs the reproduced data to the controller 111. The controller 111 controls each portion in accordance with programs stored in its internal memory.

When the disk 100 is loaded to the optical disk apparatus, various kinds of control data recorded at the ADIP in the lead-in area are read and are stored in the controller 111. Following this, when a recording command is inputted, test writing into the inner disk drive zone of the lead-in area or the outer disk drive zone of the lead-out area is performed, reproduction from the area in which the test writing was performed is performed, and optimum laser power Pw for recording is set with reference to a result of the reproduction.

Figure 3:
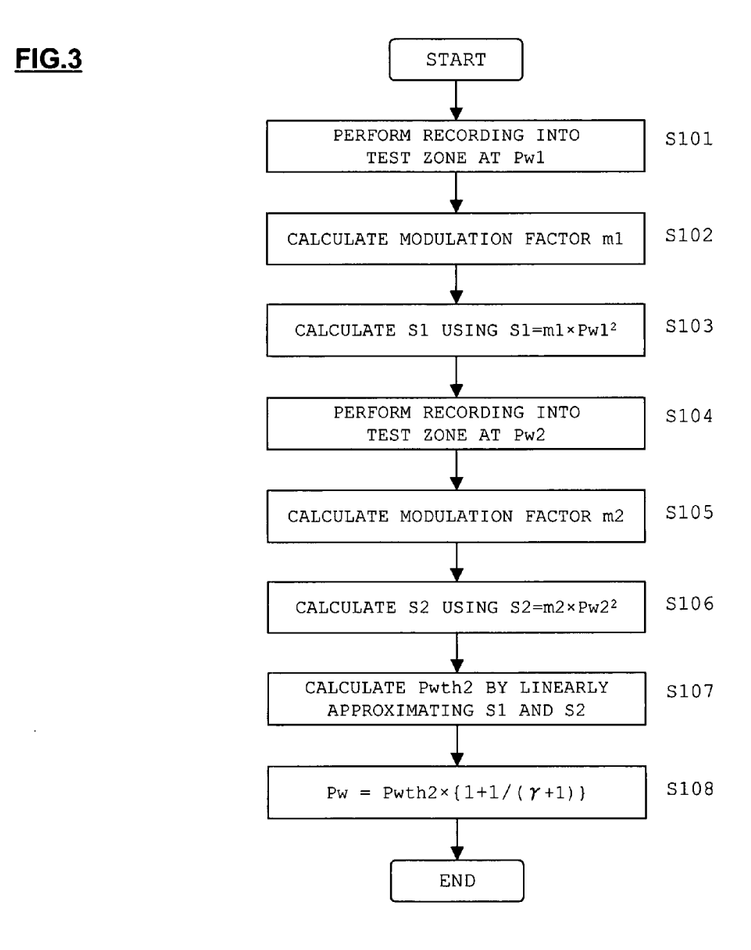
FIG. 3 is a flowchart of laser power adjustment processing according to the embodiment of the present invention.

FIG. 3 shows optimum laser power Pw setting processing according to this embodiment of the present invention.

When the laser power adjustment processing is started, predetermined data is written into any of the disk drive zones (test zones) described above at laser power Pw1 (S101). Then, the written data is reproduced and a modulation factor m1 is calculated from the strength of a reproduction RF signal obtained as a result of the reproduction (S102). Next, an integrated value S1 is calculated from the calculated modulation factor m1 and the laser power Pw1 using an expression "S1=m1×Pw1$^2$" (S103).

In such a manner, the predetermined data is written into the disk drive zone (test zone) at laser power Pw2 (Pw2≠Pw1) (S104). Then, the written data is reproduced and a modulation factor m2 is calculated from the strength of a reproduction RF signal obtained as a result of the reproduction (S105). Next, an integrated value S2 is calculated from the calculated modulation factor m2 and the laser power Pw2 using an expression "S2=m2×Pw2$^2$" (S106).

Following this, an approximation straight line is obtained from S1 and S2 and laser power Pwth2 is calculated at which the value of the approximation straight line becomes zero (S107). Then, optimum laser power Pw is calculated from Pwth2 and the target γ value set for the disk using an expression "Pw=Pwth2×{1+1/(γ+1)}" (S108).

It should be noted here that the target γ value is supplied from the controller 111 to the laser power adjustment circuit 104 at the time of the laser power adjustment. As described above, the target γ value is read from the ADIP in the lead-in area of the disk, is reproduced, and is stored in the controller 111 at the time of disk loading.

Next, the technical effects of the laser power adjustment method according to the embodiment of the present invention will be verified through comparison with a laser power adjustment method based on the linear fit method described above.

First Verification Example

In a first verification example, a DVD+RW disk available from a manufacture A was used as a sample disk, modulation factors m(Pwn), integrated values "Sn=m(Pwn)×Pwn" (based on the linear fit method), and integrated values "Sn=m(Pwn)×Pwn$^2$" (based on the embodiment) were actually measured/calculated, and optimum laser power Pw was calculated based on these values.

Figure 4:
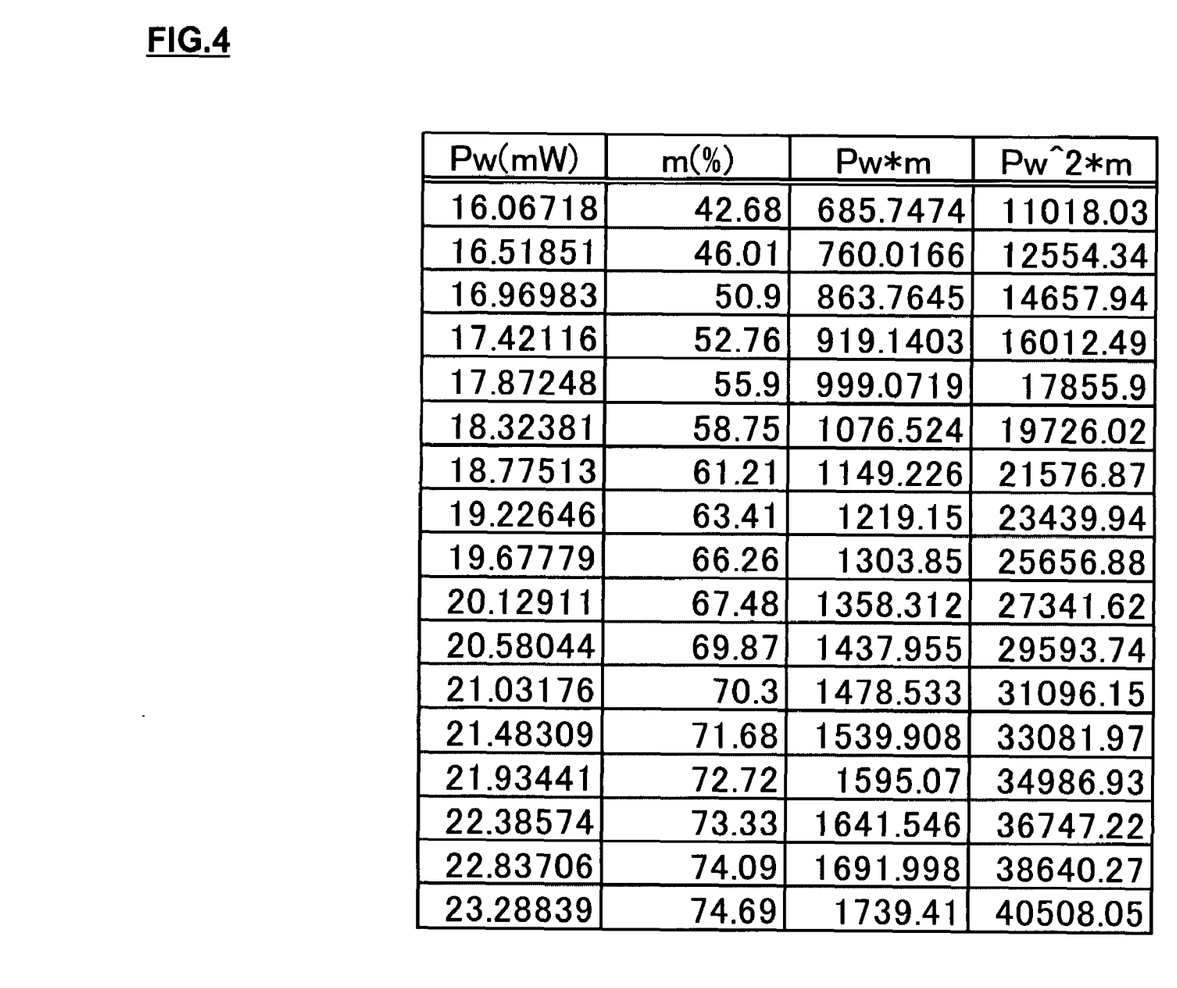
FIG. 4 shows a measurement result and a calculation result in a first verification example.
Figure 5:
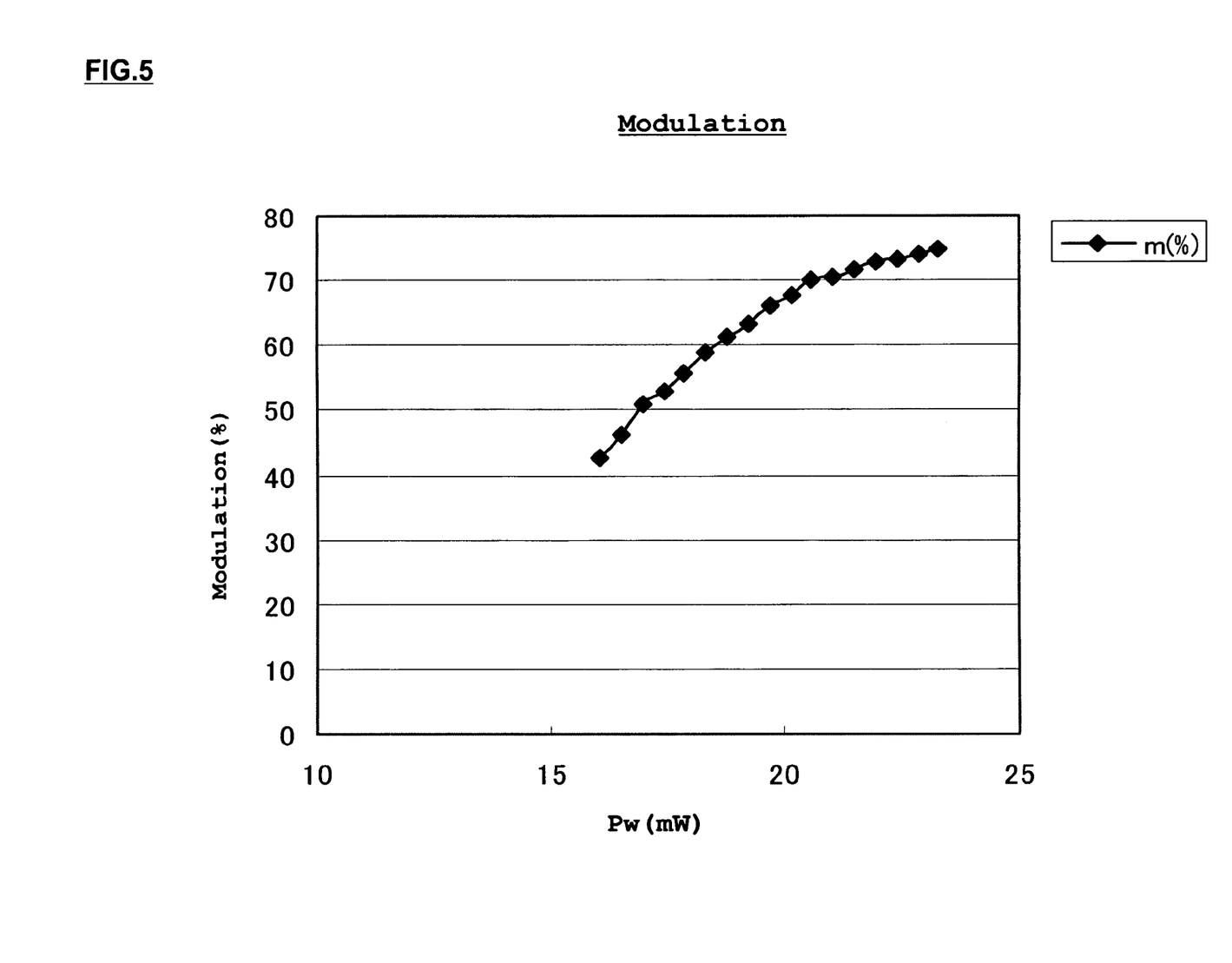
FIG. 5 shows a calculation result of a modulation factor in the first verification example.

In FIG. 4, an actual measurement/calculation result in this case is shown as numerical values. FIG. 5 is a graph drawn from the obtained modulation factors m(Pwn), FIG. 6 is graph drawn from the obtained integrated values "Sn=m(Pwn)× Pwn" (based on the linear fit method), and FIG. 7 is a graph drawn from the obtained integrated values "Sn=m(Pwn)× Pwn$^2$" (based on the embodiment).

Figure 6:
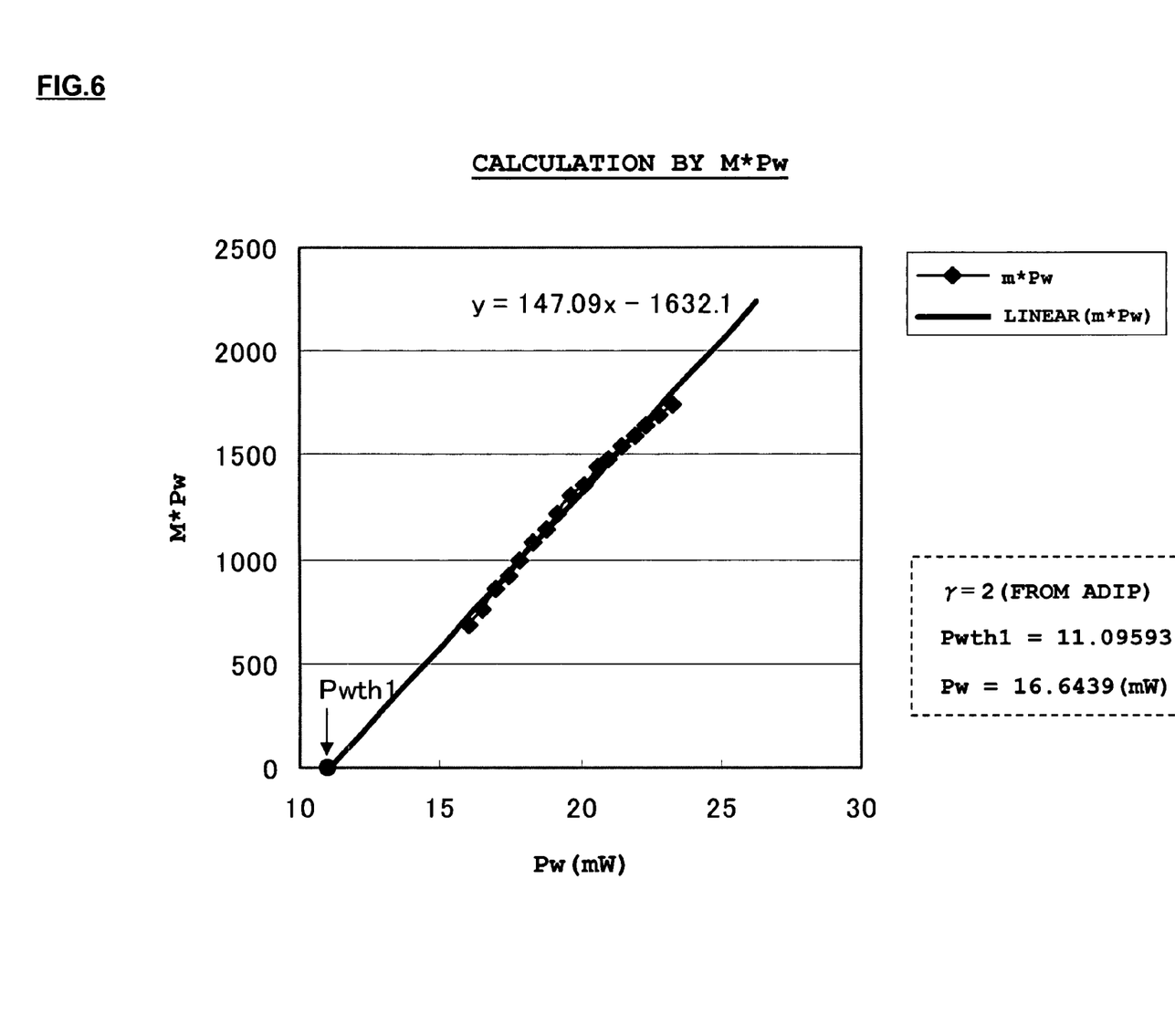
FIG. 6 shows a calculation result of an integrated value "$Sn = m(Pw) \times Pw$" in the first verification example.

It can be seen from FIG. 6 that in the case of the integrated values "Sn=m(Pwn)×Pwn" (based on the linear fit method), plots of the integrated values Sn meander on an approximation straight line (y=147.09x−1632.1). Therefore, a great difference occurs in inclination of the approximation straight line between test writing performed with laser power in a range of from 16 (mw) to 20 (mw) and test writing performed with laser power in a range of from 20 (mw) to 24 (mw) and Pwth1 obtained through the former test writing and Pwth1 obtained through the latter test writing greatly differ from each other. That is, with the conventional linear fit method, Pwth1 greatly varies depending on in which laser power range the test writing is performed. Accordingly, the laser power Pw calculated based on this Pwth1 is also greatly influenced by the laser power Pwn set at the time of the test writing.

It should be noted here that in FIG. 6, numerical values given in a lower right box surrounded by a dotted line indicate the target γ value set for the disk (obtained from the ADIP of the disk) and Pwth1 and the optimum laser power Pw calculated in accordance with the linear fit method described above.

Figure 7:
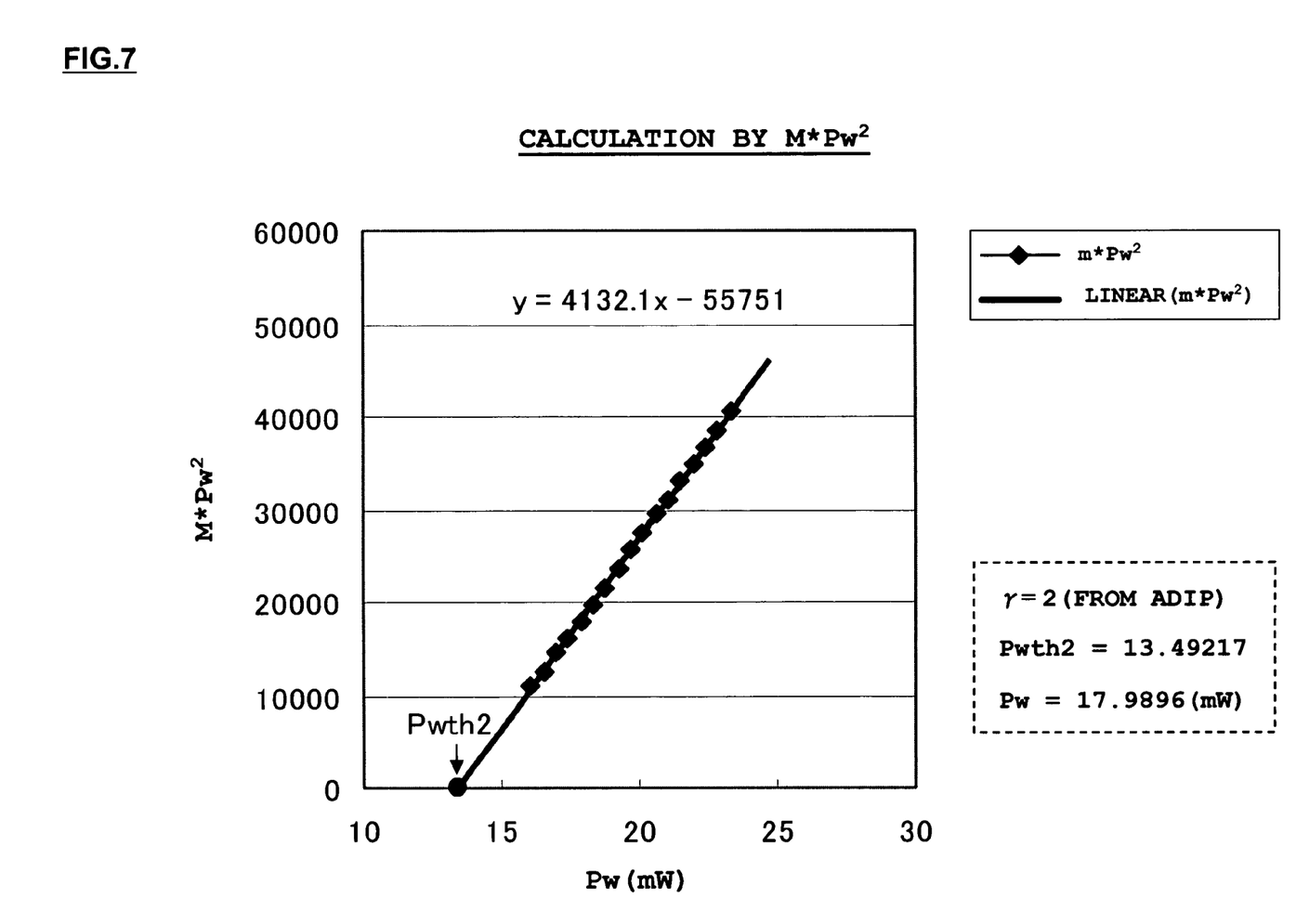
FIG. 7 shows a calculation result of an integrated value "$Sn = m(Pw) \times Pw^2$" in the first verification example.

In contrast to this, with the laser power adjustment method according to the embodiment of the present invention, as shown in FIG. 7, plots of the integrated values Sn are arranged on an approximation straight line (y=4132.1x−55751) with almost no fluctuations. Therefore, regardless of laser power range in which the test writing is performed, the inclination of an approximation line becomes approximately the same and consequently it becomes possible to obtain approximately the same Pwth2 at all times. As a result, the laser power Pw calculated based on Pwth2 also assumes approximately the same value regardless of laser power Pwn at which the test writing is performed.

It should be noted here that in FIG. 7, numerical values given in a lower right box surrounded by a dotted line indicate the target γ value set for the disk (obtained from the ADIP of the disk) and Pwth2 and the optimum laser power Pw calculated in accordance with the embodiment of the present invention.

As described above, according to the embodiment of the present invention, it becomes possible to smoothly set optimum laser power regardless of which laser power is used as laser power for the test writing. Also, the plots of the integrated values Sn are arranged on an approximation straight line with almost no fluctuations. As a result, even from integrated values Sn at only two points like in the structure example described in the above-mentioned embodiment, it becomes possible to obtain an appropriate approximation line, which makes it possible to set appropriate laser power even with a small number of times of test writing.

Second Verification Example

In this verification example, a DVD+RW disk available from a manufacture B, different from the above-mentioned manufacture A, was used as a sample disk, modulation factors m(Pwn), integrated values "Sn=m(Pwn)×Pwn" (based on the linear fit method), and integrated values "Sn=m(Pwn)×Pwn$^2$" (based on the embodiment) were actually measured/calculated, and optimum laser power Pw was calculated based on these values.

Figure 8:
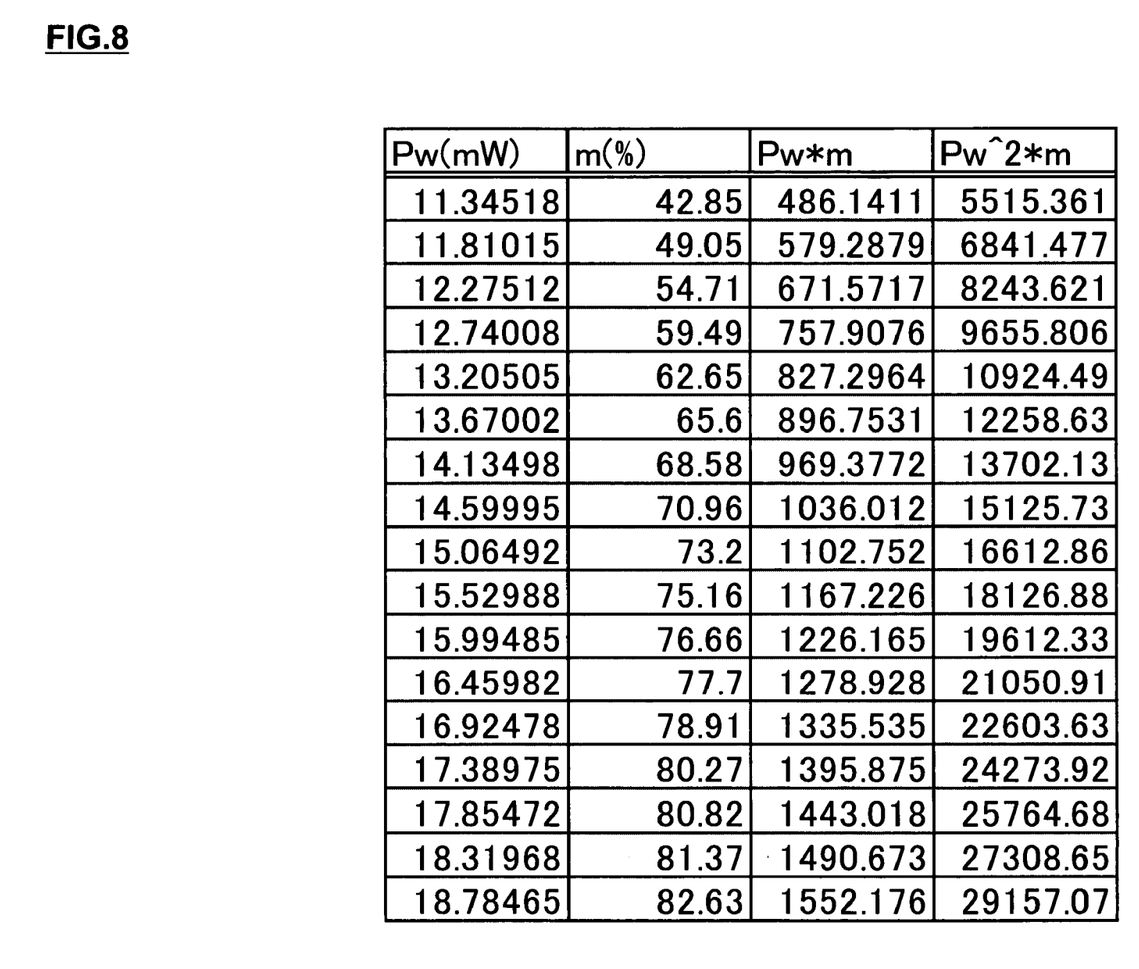
FIG. 8 shows a measurement result and a calculation result in a second verification example.
Figure 9:
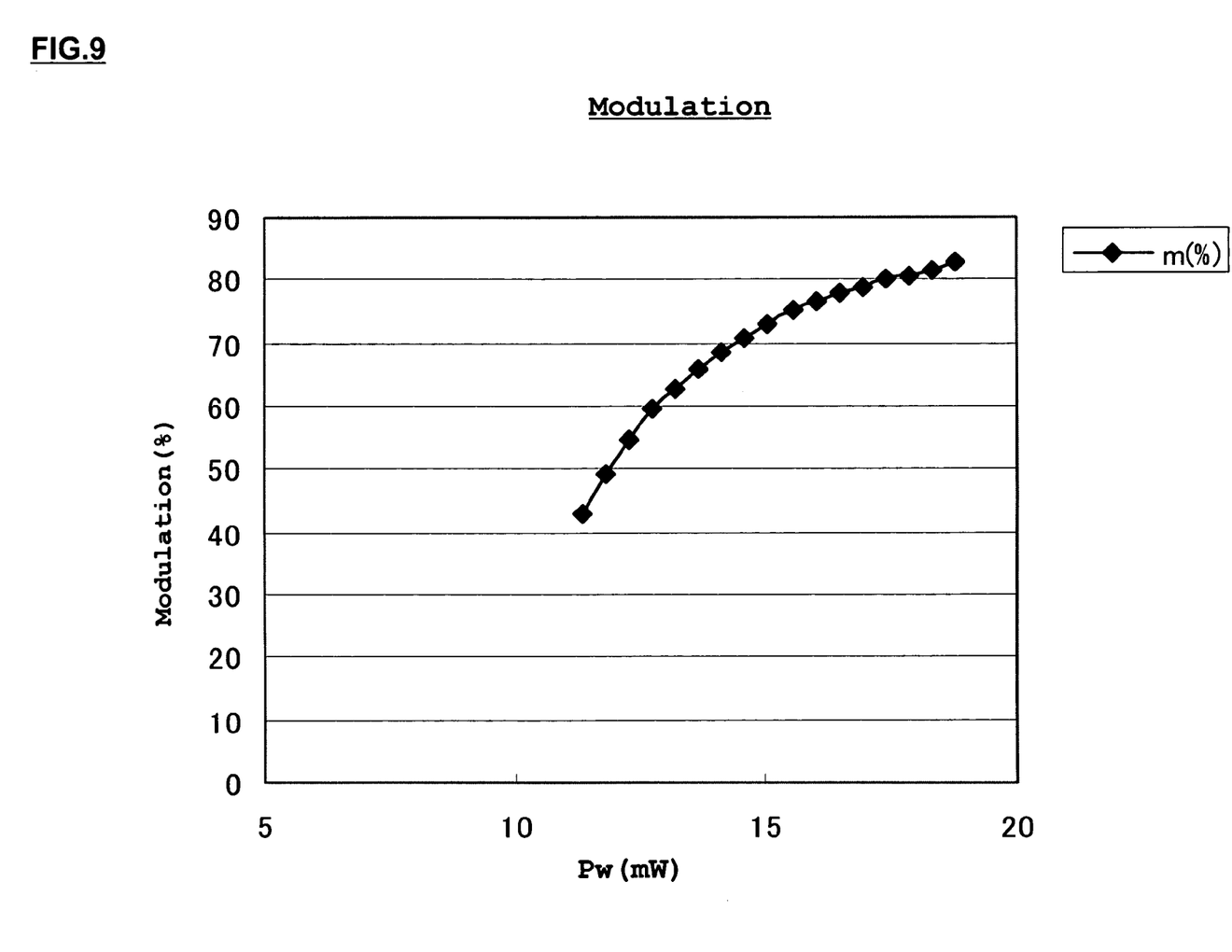
FIG. 9 shows a calculation result of a modulation factor in the second verification example.

In FIG. 8, an actual measurement/calculation result in this case is shown as numerical values. FIG. 9 is a graph drawn from the obtained modulation factors m(Pwn), FIG. 10 is graph drawn from the obtained integrated values "Sn=m(Pwn)×Pwn" (based on the linear fit method), and FIG. 11 is a graph drawn from the obtained integrated values "Sn=m(Pwn)×Pwn$^2$" (based on the embodiment).

Figure 10:
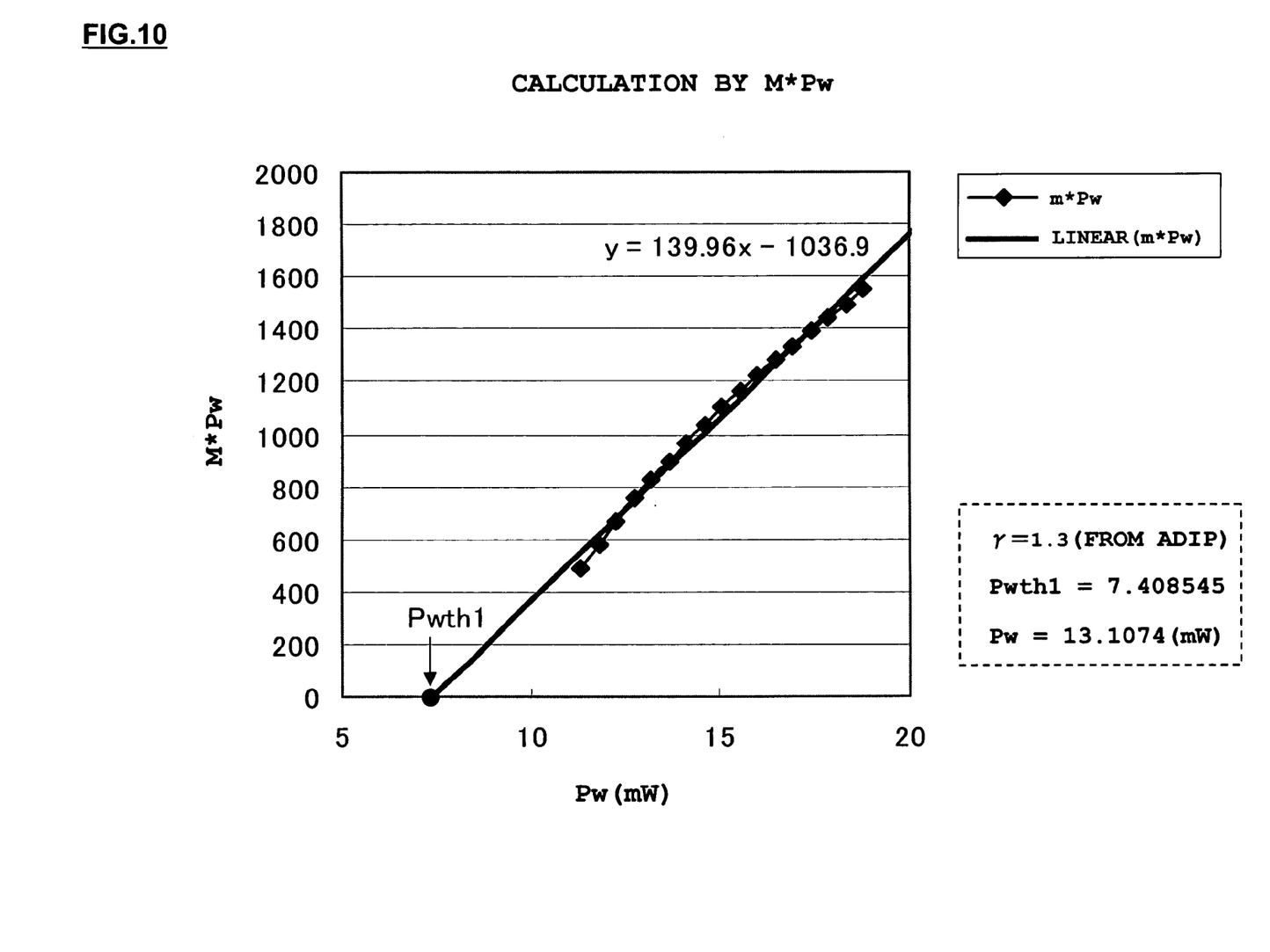
FIG. 10 shows a calculation result of the integrated value "$Sn = m(Pw) \times Pw$" in the second verification example.

It can be seen from FIG. 10 that in the case of the integrated values "Sn=m(Pwn)×Pwn" (based on the linear fit method), plots of the integrated values Sn meander on an approximation straight line (y=139.96x−1036.9). Therefore, a great difference occurs in inclination of the approximation straight line between test writing performed with laser power in a range of from 11 (mw) to 15 (mw) and test writing performed with laser power in a range of from 15 (mw) to 19 (mw) and Pwth 1 obtained through the former test writing and Pwth1 obtained through the latter test writing greatly differ from each other. That is, with the conventional linear fit method, Pwth1 greatly varies depending on in which laser power range the test writing is performed. Accordingly, the laser power Pw calculated based on this Pwth1 is also greatly influenced by the laser power Pwn set at the time of the test writing.

It should be noted here that in FIG. 10, numerical values given in a lower right box surrounded by a dotted line indicate the target γ value set for the disk (obtained from the ADIP of the disk) and Pwth1 and the optimum laser power Pw calculated in accordance with the linear fit method described above.

Figure 11:
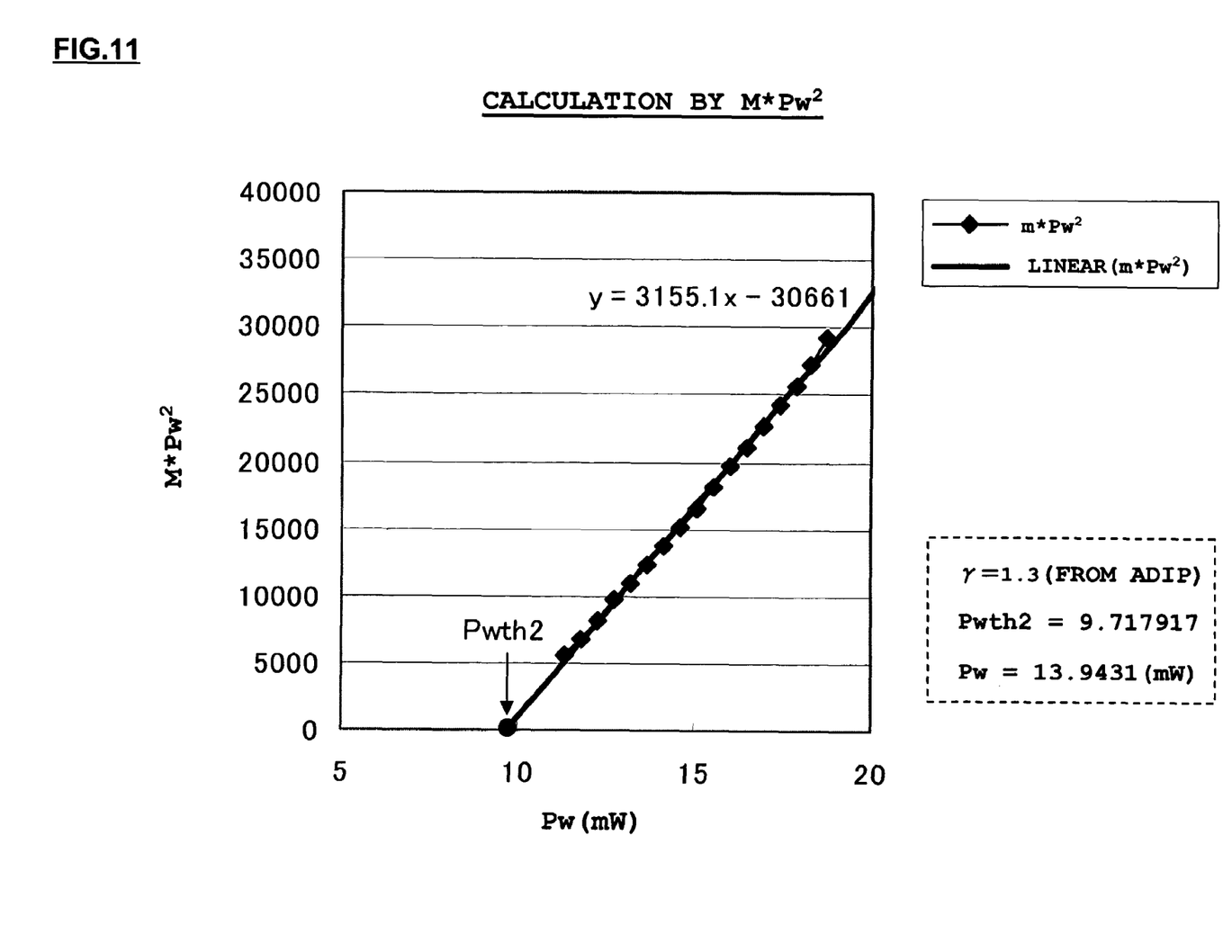
FIG. 11 shows a calculation result of the integrated value "$Sn = m(Pw) \times Pw^2$" in the second verification example.

In contrast to this, with the laser power adjustment method according to the embodiment of the present invention, as shown in FIG. 11, plots of the integrated values Sn are arranged on an approximation straight line (y=3155.1x−30661) with almost no fluctuations. Therefore, regardless of laser power range in which the test writing is performed, the inclination of an approximation line becomes approximately the same and consequently it becomes possible to obtain approximately the same Pwth2 at all times. As a result, the laser power Pw calculated based on Pwth2 also assumes approximately the same value regardless of laser power Pwn at which the test writing is performed.

It should be noted here that in FIG. 11, numerical values given in a lower right space surrounded by a dotted line indicate the target γ value set for the disk (obtained from the ADIP of the disk) and Pwth2 and the optimum laser power Pw calculated in accordance with the embodiment of the present invention.

As described above, according to the embodiment of the present invention, it becomes possible to smoothly set optimum laser power regardless of which laser power is used as laser power for the test writing. Also, the plots of the integrated values Sn are arranged on an approximation straight line with almost no fluctuations. As a result, even from integrated values Sn at only two points like in the structure example described in the embodiment, it becomes possible to obtain an appropriate approximation line, which makes it possible to set appropriate laser power even with a small number of times of test writing.

It should be noted here that as indicated by the numerical values in the boxes surrounded by the dotted lines in FIGS. 6 and 7 or the numerical values in the spaces surrounded by the dotted lines in FIGS. 10 and 11, the value of the optimum laser power Pw set in accordance with the embodiment becomes around 8% greater than that of the optimum laser power Pw set in accordance with the linear fit method described above. However, the inventors confirmed through verification of recording and reproduction characteristics that even when the laser power Pw is changed in this manner, it is possible to perform recording and reproduction with respect to the disk smoothly and appropriately.

As described above, according to the embodiment, it becomes possible to set optimum laser power smoothly and appropriately with a small number of times of test writing.

It is needless to say that the present invention is not limited to the embodiment described above and it is of course possible to make various changes to the embodiment.

For instance, in the embodiment described above, the test writing is performed twice, although the present invention is not specifically limited to this so long as the test writing is repeated at least twice.

Also, in the embodiment described above, each time test writing is performed, reproduction is performed and a modulation factor and the like are calculated. However, the modulation factor and the like may be calculated by first performing the test writing while changing the laser power and next reproducing each result of the test writing.

Further, the present invention is not limited to the application to DVD+RWs and is also applicable to a drive apparatus that performs recording and reproduction with respect to other media such as CD-RWs.

It should be noted here that the optimum laser power obtained in the manner described in the above embodiment may be fine-adjusted based on an experimental or statistical tendency. For instance, as indicated by the numerical values in the boxes surrounded by the dotted lines in FIGS. 6 and 7 or FIGS. 10 and 11, the value of the optimum laser power Pw set in accordance with the embodiment becomes around 8% greater than that of the optimum laser power Pw set with the linear fit method described above. Therefore, the optimum laser power Pw set in accordance with the embodiment may be adjusted so as to be further reduced by several percent.

It is possible to make various changes to the embodiment of the present invention as appropriate without departing from the scope of the technical idea described in the appended claims.

What is claimed is:

1. A laser power adjustment method of performing laser power strength adjustment by performing test writing into a test writing area of a recording medium, comprising steps of:

obtaining an integrated value Sn for each kind of laser power Pwn set at the time of the test writing from a modulation factor m(Pwn) of a reflection light intensity obtained at the laser power Pwn using an expression "Sn=m(Pwn)×Pwn$^2$";

approximating linearly relational characteristics of the integrated value Sn and the laser power Pwn for at least two integrated values Sn and the laser powers Pwn;

obtaining laser power Pwth at which the approximated integrated value Sn becomes zero from the linearly approximated relational characteristics; and obtaining optimum laser power Pw based on the laser power Pwth, wherein the optimum laser power Pw is obtained from a target γ value of the recording medium using an expression "Pw=Pwth×{1+1/(γ+1)}")}", the target γ value is read from the recording medium.

2. An optical recording and reproduction apparatus that records and reproduces information by irradiating laser light onto a recording medium, comprising:

means for obtaining a target γ value of the recording medium; and laser power adjustment means for adjusting laser power for recording, wherein the laser power adjustment means includes:

means for performing test writing onto the recording medium with a plurality of kinds of laser power Pwn;

means for obtaining a modulation factor m(Pwn) of a reflection light intensity for each kind of laser power Pwn set at the time of the test writing and obtaining an integrated value Sn from the obtained modulation factor m(Pwn) using an expression Sn=m(Pwn)×Pwn$^2$";

means for approximating linearly relational characteristics of the integrated value Sn and the laser power Pwn for at least two integrated values Sn and the laser powers Pwn;

means for obtaining laser power Pwth at which the approximated integrated value Sn becomes zero from the linearly approximated relational characteristics; and means for obtaining optimum laser power Pw based on the laser power Pwth, wherein the optimum laser power Pw is obtained from a target γ value of the recording medium using an expression "Pw=Pwth×{1+1/(γ+1)}", the target γ value is read from the recording medium.

3. The optical recording and reproduction apparatus according to claim 2 wherein the target γ value is obtained by reproducing control information recorded on the recording medium.

* * * * *